United States Patent [19]
Visnaw et al.

[11] Patent Number: 4,817,224
[45] Date of Patent: Apr. 4, 1989

[54] ADJUSTABLE DOORWAY RAMP APPARATUS

[76] Inventors: Daniel Visnaw, 13611 Malibu, Garden Grove, Calif. 92647; Dale Lockwood, 1120 Sycamore Ave. #5, Tustin, Calif. 92680

[21] Appl. No.: 241,455

[22] Filed: Sep. 8, 1988

[51] Int. Cl.⁴ .............................................. E01D 1/00
[52] U.S. Cl. ....................................... 14/69.5; 254/88; 52/DIG. 10
[58] Field of Search ................. 14/69.5, 71.3; 254/88; 193/38, 41; 52/69, 641, DIG. 10

[56] References Cited
U.S. PATENT DOCUMENTS

| | | | |
|---|---|---|---|
| 976,666 | 11/1910 | Lucas . | |
| 1,210,133 | 12/1916 | Baker . | |
| 1,262,930 | 4/1918 | Diaz . | |
| 1,568,303 | 1/1926 | Webster . | |
| 2,437,479 | 11/1945 | Price | 193/41 |
| 3,153,798 | 6/1962 | Drevitson | 14/69.5 |
| 3,353,789 | 5/1966 | Scott | 254/88 |
| 3,994,474 | 11/1976 | Finkbeiner | 254/88 |
| 4,329,752 | 5/1982 | Forrest . | |

FOREIGN PATENT DOCUMENTS 1353286 5/1974 United Kingdom ................. 193/38

*Primary Examiner*—Stephen J. Novosad
*Assistant Examiner*—Gay Spahn
*Attorney, Agent, or Firm*—Leon Gilden

[57] ABSTRACT

An adjustable doorway ramp apparatus is set forth wherein a doorway ramp is of a triangular wedge member configuration and includes a first, second, third, fourth, fifth, sixth, and seventh ramp associated therewith. The first ramp is positioned at an uppermost portion of the ramp apparatus and is pivotally mounted in forwardmost portion thereof with a fourth ramp pivotally mounted displaceably rearwardly therefrom by a rack and pinion arrangement. A second ramp is in underlying position to said first ramp and is of a trapezoidal configuration and releasably securable to a third ramp of trapezoidal configuration dimension substantially greater than that of said second ramp. A fifth ramp is positionable between said first and second ramps to arcuately position said first ramp relative to said second ramp with a sixth ramp and seventh ramp slidably mounted within said third ramp for positioning about an associated door sill.

8 Claims, 3 Drawing Sheets

ADJUSTABLE DOORWAY RAMP APPARATUS

BACKGROUND OF THE INVENTION

1. Field of the Invention

The field of invention relates to ramps, and more particularly pertains to an adjustable doorway ramp apparatus that is positionable proximate a doorway with accessory ramps included therewith for adjustably positioning the various portions of the ramp apparatus relative to the doorway and sill arrangement.

2. Description of the Prior Art

The use of ramps of various configurations is well known in the prior art. They are provided in various configurations and shapes for loading purposes, but are generally of unique organizations not adaptable for positioning relative to doorways and sills associated therewith for the traverse of goods therethrough. For example, U.S. Pat. No. 976,666 to Locus sets forth a loading ramp utilizing a forwardly and rearwardly hinged portion for adjustment of the forward and rearwardmost portions to accommodate loading of an associated wagon.

U.S. Pat. No. 1,210,133 to Baker sets forth a loading ramp or skid wherein an essentially planar portion utilizes a forwardmost pivoted member with an arcuate forwardmost portion for accommodating various heights of entrance levels above an associated surface.

U.S. Pat. No. 1,262,930 to Diaz sets forth a ramp utilizing a plurality of pivotally mounted portions thereof for accommodating entranceways for vehicular traverse therethrough.

U.S. Pat. No. 1,568,303 to Webster sets forth a loading skid wherein a forwardly and rearwardly mounted portion thereof includes a plurality of pivoted plates thereon for forward and rearward adjustment of the ramp orientation relative to loading surfaces.

U.S. Pat. No. 4,329,752 to Forrest sets forth a plurality of interhinged loading ramps wherein a forwardmost portion is secured to a winch to accommodate various loading conditions to load from a first level to a second level.

As such, it may be appreciated that there is a continuing need for a new and improved adjustable doorway ramp apparatus which addresses both the problem of versitility and effectiveness and in this respect, the present invention substantially fulfills this need.

SUMMARY OF THE INVENTION

In view of the foregoing disadvantages inherent in the known types of adjustable ramps now present in the prior art, the present invention provides an adjustable ramp wherein the same may be conveniently stored during periods of non-use and readily and effectively adjusted to accommodate portals of varying heights. As such, the general purpose of the present invention, which will be described subsequently in greater detail, is to provide a new and improved adjustable doorway ramp apparatus which has all the advantages of the prior art adjustable ramps and one of the disadvantages.

To attain this, the present invention comprises a wedge-shaped ramp formed of subcomponents that are each adjustable to enable accommodation of movement from one level to another. An uppermost wedge-shaped element is pivotally mounted to an underlying trapezoidal member wherein a further trapezoidal member is removably mounted related to said first noted trapezoidal member. A plurality of wedge-shaped members are nested within the further trapezoidal member for positioning about an associated door sill when utilizing the instant invention in association with a conventional doorway opening. The first wedge-shaped member is provided with a rack and pinion to arcuately displace a further wedge-shaped member rearwardly thereof to accommodate gaps between a raised level and the invention when the first wedge-shaped member is pivoted upwardly. Positioning of the first wedge-shaped member in upward position is accommodated by means of a positioning wedge positioned between said first wedge-shaped member and said trapezoidal member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable doorway ramp apparatus which has all the advantages of the prior art adjustable doorway ramp apparatus and none of the disadvantages.

It is another object of the present invention to provide a new and improved adjustable doorway ramp apparatus which may be easily and efficiently manufactured and marketed.

It is a further object of the present invention to provide a new and improved adjustable doorway ramp apparatus which is of a durable and reliable construction.

An even further object of the present invention is to provide a new and improved adjustable doorway ramp apparatus which is susceptible of a low cost of manufacture with regard to both materials and labor, and which accordingly is then susceptible of low prices of sale to the consuming public, thereby making such adjustable doorway ramp apparatus economically available to the buying public.

Still yet another object of the present invention is to provide a new and improved adjustable doorway ramp apparatus which provides in the apparatuses and methods of the prior art some of the advantages thereof, while simultaneously overcoming some of the disadvantages normally associated therewith.

Still another object of the present invention is to provide a new and improved adjustable doorway ramp apparatus wherein the same is of a generally wedge-shaped configuration and is provided with subcomponents for accommodating traverse from one level to another.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
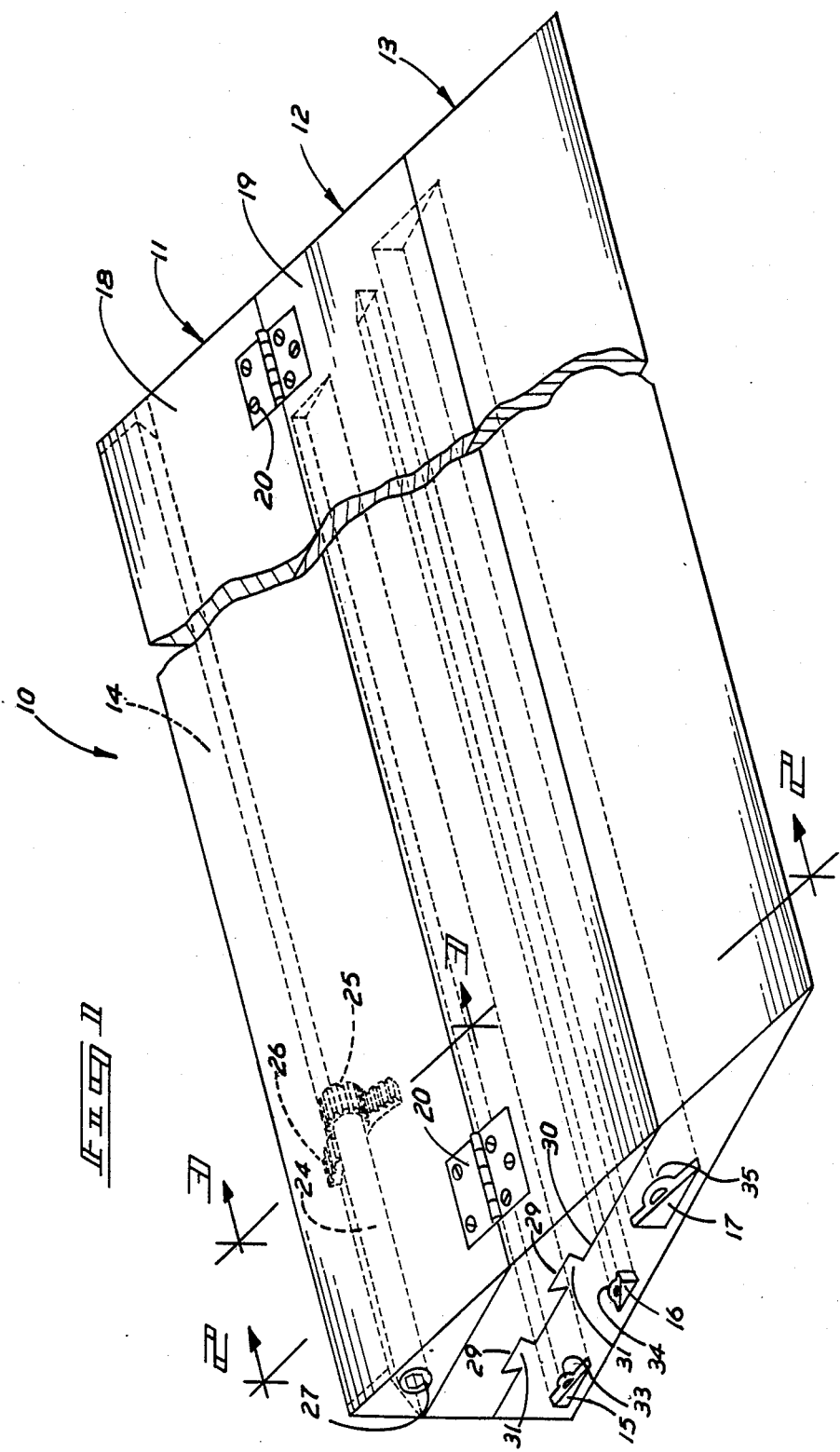
FIG. 1 is an isometric illustration of the instant invention.
Figure 2:
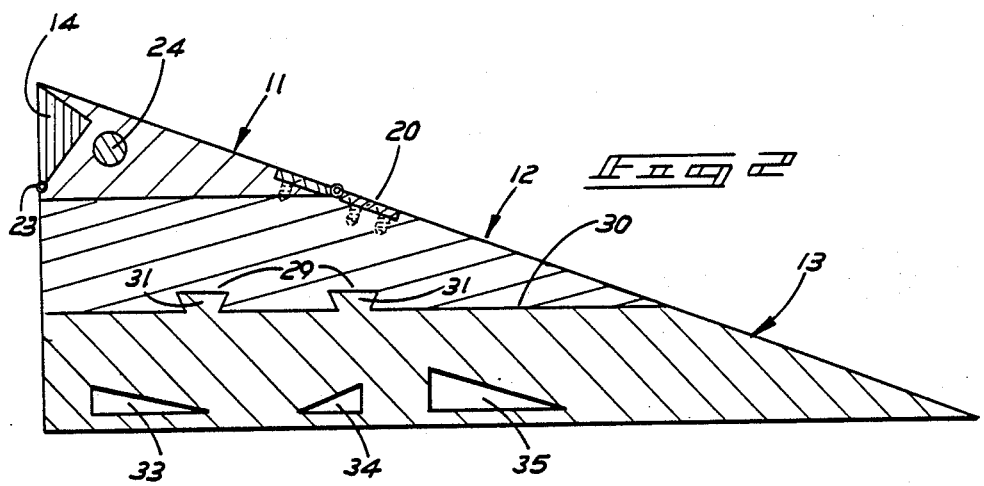
FIG. 2 is an orthographic view of the instant invention taken along the lines 2—2 of FIG. 1 in the direction indicated by the arrows.

With reference now to the drawings, and in particular to FIGS. 1 to 5 thereof, a new and improved adjustable doorway ramp apparatus embodying the principles and concepts of the present invention and generally designated by the reference numeral 10 will be described.

More specifically, it will be noted that the adjustable doorway ramp apparatus 10 essentially comprises a top or first wedge-shaped member 11 pivotally secured and overlying a second member 12 of trapezoidal configuration. The second member 12 is mechanically secured to a third member 13, also of a trapezoidal cross-sectional configuration somewhat greater than that of second member 12. Pivotally mounted through a rear face of the first member 11 is a fourth member 14 of generally triangular cross-sectional configuration mounted to an interior cavity of the first wedge member 11. A fifth member 15 of triangular cross-sectional configuration, as well as a sixth member 16 and a seventh member 17 also of triangular cross-sectional configuration, are mounted and positioned when not in use within complementary cavities formed within the third member 13. A plurality of hinges 20 mounted to upper surfaces 18 and 19 to respective members 11 and 12 enable the pivotal relationship of the first member 11 to the second member 12.

The lower planar face 21 of the first wedge member 11 is of a complementary planar shape to the upper face 28 of the second member 12. Rear planar face 22 of the first member 11 is orthogonally formed relative to the lower face 21 wherein fifth member 15 is removable from its respective complementary cavity coextensively formed within the third member 13 and positionable, as illustrated in FIG. 3, between the lower face 21 of the first member and upper surface 28 of the second member to pivotally orient the first member 11 to accommodate variations in height of a level proximate a door opening "D", as illustrated in FIG. 5.

Figure 3:
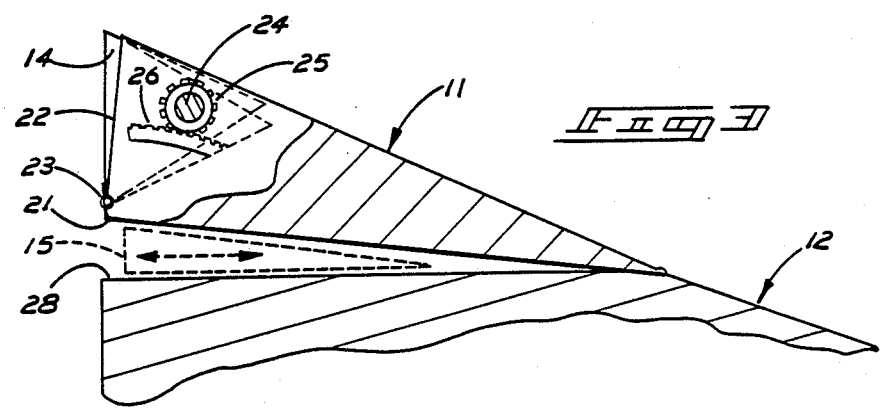
FIG. 3 is an orthographic view of the instant invention taken along the line 3—3 of FIG. 1 in the direction indicated by the arrows further illustrating the first wedge-shaped member in a raised orientation.
Figure 4:
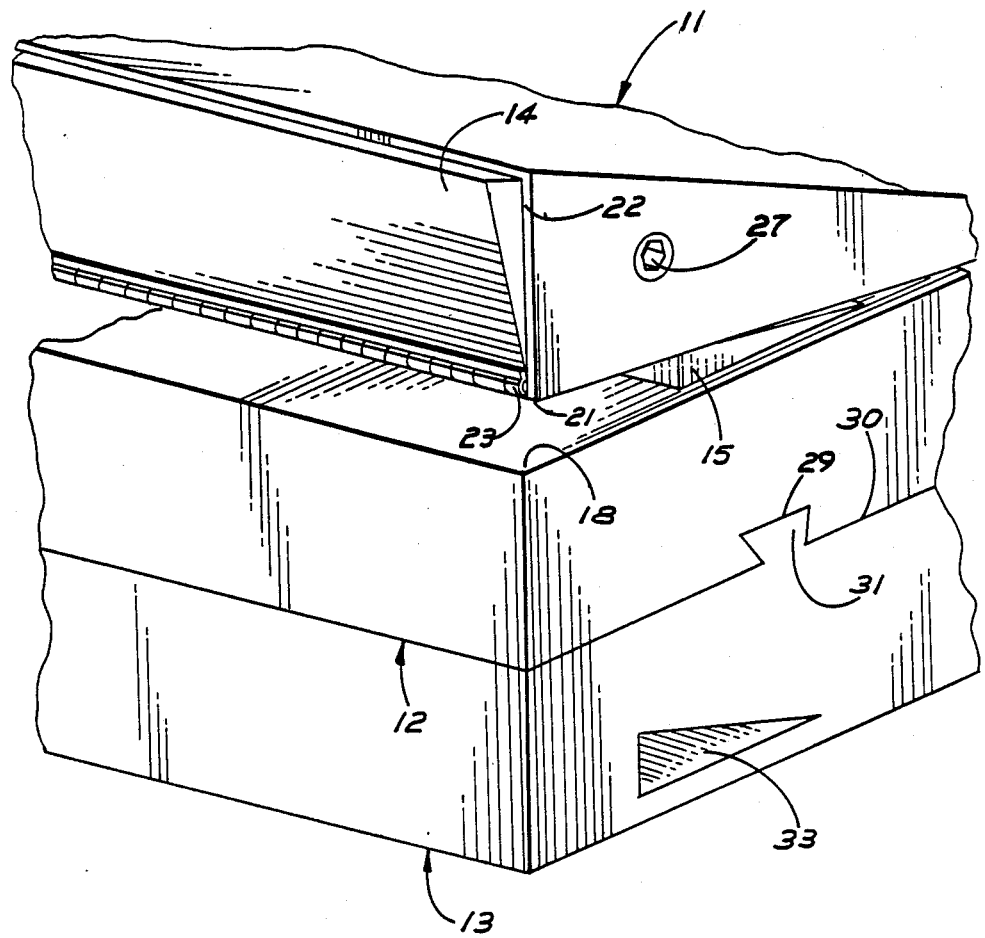
FIG. 4 is a rear isometric view of the invention illustrating the further wedge-shaped member positioned within the first wedge-shaped member.

The fourth member 14 is pivotally mounted within a complementary recess formed through the rear planar face 22 of the first member 11 including a coextensive piano-type hinge 23 secured to the fourth member 14 and the first member 11, as illustrated in FIGS. 3 and 4. A shaft 24 is rotatably mounted within the first member 11 and terminates at a first end interiorly of the first member 11 with a pinion 25 cooperating with a rack 26 integrally secured to the fourth member 14 whereby upon rotation by access to a recessed drive face 27 terminating in a second end of the shaft 24, the rotation of pinion 25 relative to rack 26 pivots the fourth member 14 exteriorly of the rear face 22 of the first member 11 to accommodate a gap created by the upward pivoting of the first member 11 by use of the aforenoted fifth member 15.

The third member 13 is selectively mounted to the second member 12 by a plurality of dovetail projections 31 projecting upwardly of an upper surface of the third member 13 cooperating within complementary and coextensive dovetail recesses 29 formed within the lower face 30 of the second member 12.

Figure 5:
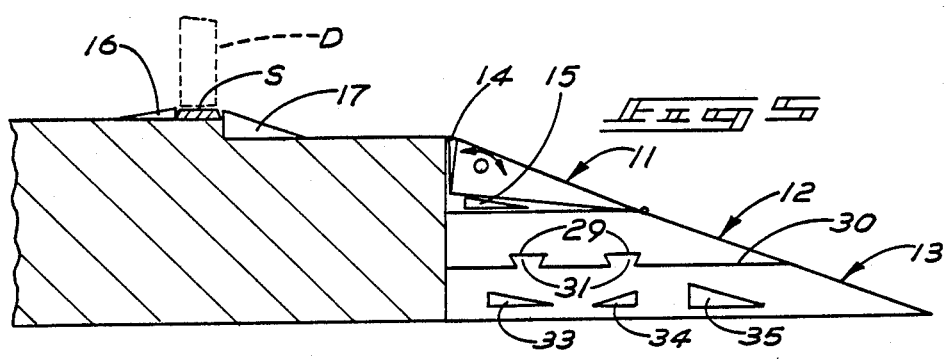
FIG. 5 is an orthographic view of the instant invention in association with a conventional doorway opening.

Reference to FIG. 5 illustrates the use of the sixth and seventh members 16 and 17 respectively of the triangular wedge member configuration and removable from the respective recesses 34 and 35 of the third member 13 and positionable about a door sill "S", as illustrated in FIG. 5.

In this manner, accommodation of abrupt elevational changes by use of the instant invention is available and enables a convenient transport of items along the respective upper slanted surfaces of the various members and when not in use, enables storage of the accessory wedge members 14, 15, 16, and 17.

As to the manner of usage and operation of the instant invention, the same should be apparent from the above description and accordingly, no further discussion relative to the manner of usage and operation of the instant invention will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable wedge-shaped ramp apparatus positionable on a first level relative to a vertically spaced upper level comprising, a first wedge-shaped member including a lower planar face, a rear planar face orthogonally formed to said lower face, and an upper surface joining said rear and lower planar faces, and said first member pivotally joined at an edge, formed by the junction of the upper surface and the lower planar face, to an underlying second member wherein the pivotal joining includes a plurality of hinges secured to said upper surface of said first member and to an upper surface of said second member, and a third member underlying said second member and mechanically and removably secured to said second member, and said second and third members formed of trapezoidal cross-sectional configurations.

2. An adjustable wedge-shaped ramp apparatus as set forth in claim 1 wherein said first member includes a pivotally mounted fourth member positionable within a cavity of said first member and movable between a first position interiorly of said first member to a second position exteriorly of said first member.

3. An adjustable wedge-shaped ramp apparatus as set forth in claim 2 wherein said fourth member includes a gear rack cooperative with a pinion rack wherein said pinion rack is formed on a shaft coextensive to said fourth member and terminating in a side face of said first member for access to enable rotation of said pinion.

4. An adjustable wedge-shaped ramp apparatus as set forth in claim 3 wherein said second member is mechanically secured to said third member by a plurality of dovetails integrally formed to said third member and slidably secured within complementary dovetail recesses formed through a lower face of said second member.

5. An adjustable wedge-shaped ramp apparatus as set forth in claim 4 wherein said third member includes a plurality of coextensive recesses therethrough of triangular cross-sectional configuration for slidably receiving therein a like plurality of fifth, sixth, and seventh triangular wedge members.

6. An adjustable wedge-shaped ramp apparatus as set forth in claim 5 wherein said fifth member is positionable between said first member and said second member for pivotally elevating said first member relative to said second member.

7. An adjustable wedge-shaped ramp apparatus as set forth in claim 6 wherein said sixth member is slidably removable from within said third member and positionable adjacent a door sill associated with said vertically spaced upper level.

8. An adjustable wedge-shaped ramp apparatus as set forth in claim 7 wherein said seventh member is slidably removable from said third member and positionable adjacent said door sill on the opposite side thereof relative to said sixth member.

* * * * *